(No Model.)

A. J. REYNOLDS.
HOSE NOZZLE.

No. 571,799. Patented Nov. 24, 1896.

Inventor
Adrian J. Reynolds

Witnesses
J. F. Pattison
R. M. Smith

By his Attorneys,
C. A. Snow & Co.

UNITED STATES PATENT OFFICE.

ADRIAN J. REYNOLDS, OF NASHVILLE, MICHIGAN, ASSIGNOR OF ONE-HALF TO W. S. POWERS, OF SAME PLACE.

HOSE-NOZZLE.

SPECIFICATION forming part of Letters Patent No. 571,799, dated November 24, 1896.

Application filed May 23, 1896. Serial No. 592,781. (No model.)

*To all whom it may concern:*

Be it known that I, ADRIAN J. REYNOLDS, a citizen of the United States, residing at Nashville, in the county of Barry and State of Michigan, have invented a new and useful Hose-Nozzle, of which the following is a specification.

Figure 1:
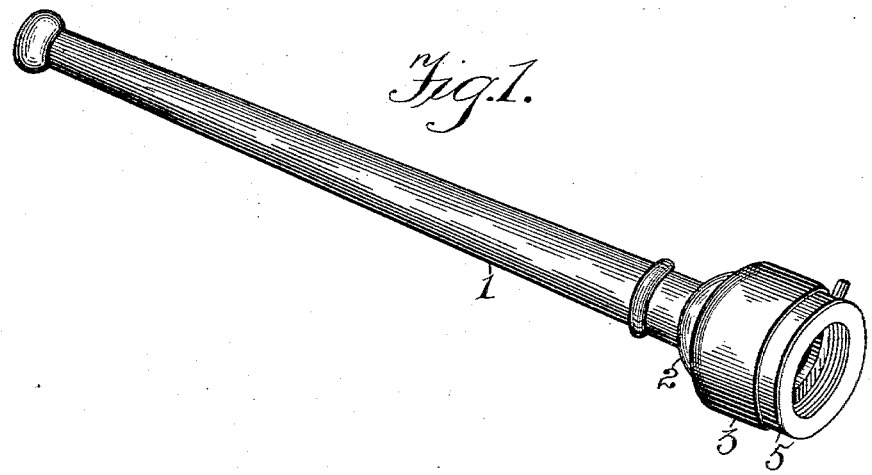
Figure 2:
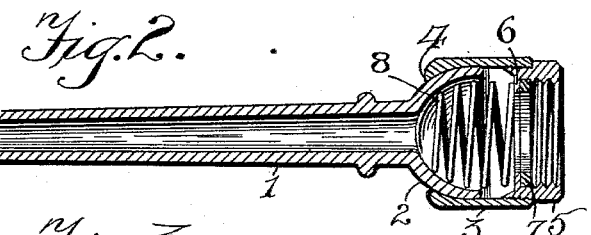
Figure 3:
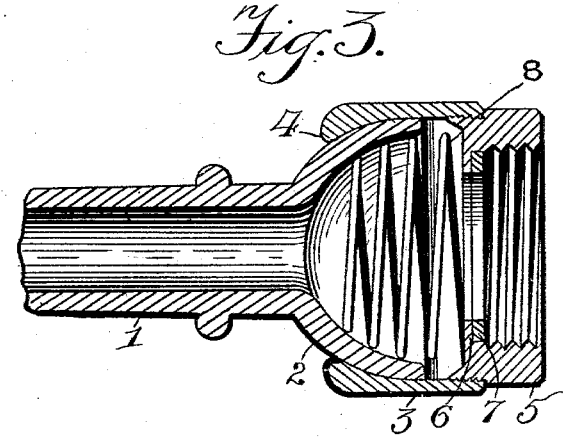

This invention relates to hose-nozzles, and the object in view is to provide an improved coupling adapted to be located between the inner end of the nozzle and the hose, the said coupling and nozzle being connected in a manner which will allow the nozzle to be turned or pointed in any direction without affecting the hose or bending or twisting the same, thereby overcoming and doing away with any side thrusts or jerking and kicking of the hose while the water is passing therethrough under heavy pressure.
To this end the invention consists in a hose-nozzle embodying certain novel features and details of construction, as hereinafter particularly set forth, illustrated in the drawings, and incorporated in the claim.
In the accompanying drawings, Figure 1 is a perspective view of the improved nozzle complete and ready to be attached to the hose. Fig. 2 is a longitudinal section through the same. Fig. 3 is an enlarged section showing the connection between the inner end of the nozzle proper and coupling.

Similar numerals of reference designate corresponding parts in the several figures of the drawings.
Referring to the accompanying drawings, 1 designates the main body of the nozzle, which for the purpose of carrying out the present invention is provided at its inner end with a concavo-convex expanded portion forming a hollow half-spherical shell 2.

3 designates a collar which extends around the shell 2, and is provided at its front open end with an inwardly-extending annular flange 4, conforming upon its inner surface to the curvature of the exterior surface of the shell 2, so as to establish a close and water-tight fit between the collar 3 and the nozzle 1 when under pressure. A ball-and-socket joint is thus obtained between the collar and nozzle, the opening in the front of the collar being sufficiently large to allow the nozzle to be rotated and to be turned in any direction whatever without interfering with the water-discharge and without bending or twisting the hose to which the nozzle is attached.

The collar 3 is internally threaded at its rear portion, and an externally-threaded bushing or collar 5 is screwed into the collar, said bushing or collar being itself internally threaded to receive the hose-coupling. The bushing or collar 5 is also provided with an inwardly-extending annular flange 6, against which is placed a flexible packing-washer 7, against which the hose-coupling may be screwed for forming a tight joint. A coiled spring 8 is interposed between the bushing or collar 5 and the nozzle, said spring bearing at one end against the bushing and having the coils at its other end reduced in conical form and lying within the hollow portion of the shell 2 of the nozzle. This spring serves to hold the ball-and-socket joint seated when the nozzle is not under pressure, and the arrangement of the spring within the shell leaves ample turning room for said shell within the surrounding collar.

From the foregoing description it will be understood that the water-pressure will of itself hold the hemispherical shell of the nozzle tightly against its seat in the collar 3 and prevent any escape of the water at such joint; also that the nozzle may be turned readily and with little effort in any desired direction or at any angle with relation to the hose for directing the stream of water where needed. All bending or twisting of the hose and the consequent jerking thereof are thus obviated.

It will be apparent that changes in the form, proportion, and minor details of construction may be resorted to without departing from the spirit or sacrificing any of the advantages of this invention.

Having thus described the invention, what is claimed as new is—

A nozzle having a hollow hemispherical shell at one end, in combination with a collar conforming upon its inner surface to the exterior contour of said shell, a bushing removably fitted in said collar, and a spring interposed between the bushing and the nozzle and having its end coils reduced in diameter to fit within the shell of the nozzle, substantially as described.

In testimony that I claim the foregoing as my own I have hereto affixed my signature in the presence of two witnesses.

ADRIAN J. REYNOLDS.

Witnesses:
JAMES B. MILLS,
EDWARD LIEBHAUSER.